United States Patent [19]

Dembicki et al.

[11] Patent Number: 4,623,704

[45] Date of Patent: Nov. 18, 1986

[54] USE OF MEMBRANES FOR ETHYLENE RECOVERY IN POLYMERIZATION PROCESSES

[75] Inventors: Dennis R. Dembicki, Fort Saskatchewan, Canada; Frederick L. Coan, Pittsburg, Calif.; Craig L. Glassford, Sarnia, Canada; Dana C. Overman, Pleasant Hill, Calif.

[73] Assignee: The Dow Chemical Company, Midland, Mich.

[21] Appl. No.: 796,384

[22] Filed: Nov. 8, 1985

[51] Int. Cl.$^4$ .............................................. C08F 6/10
[52] U.S. Cl. ......................................... 526/68; 526/73
[58] Field of Search ................................... 526/68, 77

[56] References Cited

U.S. PATENT DOCUMENTS 4,200,714 4/1980 Mahoney ............................... 526/68
4,235,983 11/1980 Steigelmann ......................... 526/68

*Primary Examiner*—Paul R. Michl

[57] ABSTRACT

An improved process for recovery of ethylene from a polymerization process is described. A normally solid membrane is employed to recover an ethylene enriched gas stream from the polymerization vent gases. The ethylene enriched gas stream is recycled to the polymerization process.

16 Claims, 1 Drawing Figure

USE OF MEMBRANES FOR ETHYLENE RECOVERY IN POLYMERIZATION PROCESSES

BACKGROUND OF THE INVENTION

This invention relates to an improved process for polymerization of ethylene. More specifically, improved efficiency is attained by use of membranes to recover ethylene from vent gases.

Processes for manufacture of polyethylene or other ethylene polymers generally do not achieve total conversion of ethylene. Conventionally, ethylene is separated from the ethylene polymer by flash devolatilization. The recovered ethylene can be recycled if of suitable purity. Over time ethane, methane, diluents and other undesirable impurities accumulate in the vent gas, i.e., the mixture of unconverted gaseous reactants, impurities and by-products resulting from the polymerization process. In catalyzed polymerizations these impurities can reduce catalyst activity. Cryogenic separations for recovery of ethylene are relatively expensive. Likewise adsorbent systems are costly in capital, energy and operating costs. Consequently, frequently the impure ethylene is limited to uses where it is less valuable than as a monomer.

U.S. Pat. No. 3,758,603 describes the use of a liquid barrier on a semi-permeable membrane to separate ethylene from ethane and methane. The liquid barrier contains complex forming metal ions. However, these liquid barriers have not proven very durable in commercial operation.

A method of separating ethylene which is simple, durable and cost-effective is desirable. Applicants have now found that normally solid semi-permeable membranes which traditionally have been viewed to afford inadequate separation of ethylene and ethane can surprisingly enhance the ethylene efficiency of polymerization processes.

SUMMARY OF THE INVENTION

An improved process for manufacture of ethylene polymers has been discovered. The improvement comprises contacting at least part of the gas mixture remaining after polymerization containing unconverted ethylene monomer with a normally solid, semi-permeable membrane at conditions which promote selective permeation of ethylene through the membrane. The ethylene enriched permeate is then recycled as feed for the polymerization of ethylene.

In another embodiment of the invention, water-dry, cellulose acetate membranes can be more generally used to separate unsaturated hydrocarbons from saturated hydrocarbons. Preferably, the hydrocarbons to be separated are predominantly $C_2$ to $C_8$ alkenes and $C_1$ to $C_8$ alkanes. More preferably, the alkane and alkene separated contain the same number of carbon atoms. The preferred cellulose acetate membrane is an asymmetric cellulose triacetate.

DETAILED DESCRIPTION OF THE DRAWING

Figure 1:
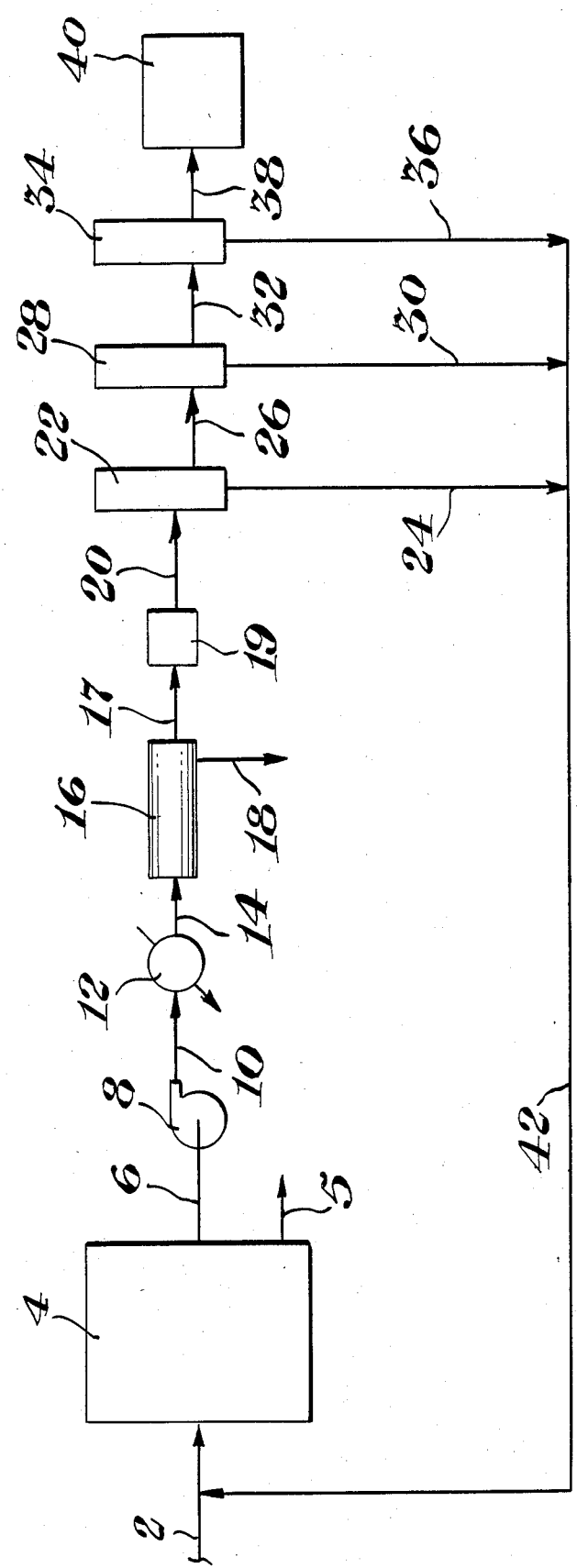

FIG. 1 is a schematic illustration of an embodiment of the process of this invention.

DETAILED DESCRIPTION OF THE INVENTION

The improved process described herein can be readily adapted to a variety of processes for making ethylene polymers. The term "ethylene polymers" is intended to include low density polyethylene homopolymer, high density polyethylene homopolymer, linear low density polyethylene and processes for making other copolymers or terpolymers of ethylene monomers, so long as the process results in a gaseous by-product containing unconverted ethylene monomer. The polymerization process can be conducted in a fluid bed, stirred bed, slurry or solution. Such polymerization processes are well-known in the prior art. See, e.g., *Kirk-Othmer Encyclopedia of Chemical Technology*, 3rd Ed., Vol. 16, pp. 385-452 (1982).

The ethylene-containing vent gases frequently contain ethane, methane, water, polymerization diluents, nitrogen and hydrogen chloride in varying concentrations. It is generally desirable to remove water, hydrogen chloride and diluents from the gas mixture to be brought in contact with the membrane. Dessicants, such as silica gel, are conveniently used to remove water. Conventional adsorbents known in the art can be used to selectively remove hydrogen chloride. The gas mixture can be compressed and cooled, as necessary, to condense diluents present in the gas and the liquid diluent is then separated.

The pressure and temperature of the gaseous feed to the membrane can operably vary over a considerable range dependent upon the physical characteristics of the membrane. The pressure and temperature of the product gas from the polymerization process and the feed to the polymerization process are important considerations in selecting operating conditions for the membrane. Advantageously, the pressure and temperature of the feed to the membrane is selected to avoid unnecessary compression cooling or heating of the vent gas. Likewise, it is advantageous if the pressure and temperature of the permeate is close to that of the feed to the polymerization process. Of course, the conditions of temperature and pressure ultimately must be selected to provide the optimum efficiency of the overall process.

A pressure differential across the membrane in the range from about 25 to about 1200 pounds per square inch (psi), i.e., 172 to 8268 kilopascal (kPa), is typically operable, provided the membrane will tolerate these pressures. A pressure differential of at least about 100 psi (689 kPa) is preferred. Typically, separation performance and productivity improve with increases in the transmembrane pressure.

The temperature during contact with the membrane is preferably in the range from about $-10°$ to about $40°$ C. Higher temperatures than those in the preferred range can be used if the membrane is not adversely affected by compaction, loss of physical strength or decline in separation performance at these higher temperatures. Lower temperatures than those in the preferred range are operable if the physical properties of the membrane and membrane permeability are not deleteriously affected. Generally, it is advantageous to avoid the presence of liquid hydrocarbons in contact with the membrane, although the presence of some liquid hydrocarbons may be tolerated with preferred membrane compositions.

Cooling or heating of the feed to the membrane can be effected by conventional means. In one preferred embodiment of the invention, the membrane feed is cooled in part by heat exchange with the membrane permeate or non-permeate from the membrane.

Not all of the gas from the polymerization process requires treatment with a membrane. Treatment of only part of the gas can remove sufficient impurities to permit recycle of the remaining gas stream. In a preferred embodiment of this invention, sufficient gas is treated to afford an ethylene concentration of at least about 97.0 mole percent ethylene in the gas recycled.

The normally solid membranes used herein for separation are generally known in the prior art. These membranes advantageously do not contain or contact a liquid barrier which modifies separation characteristics. Illustrative membranes are described in U.S. Pat. Nos. 3,415,038; 3,842,515; 4,080,743; 4,127,625; 4,130,403 and 4,421,529, as well as British Pat. No. 1,478,085.

Operable membranes include organic polymers and copolymers, optionally containing adjuvants such as fillers, plasticizers, stabilizers and permeability modifiers. Illustrative polymer compositions suitable for use in membranes can be selected from polysulfone, polyethersulfone, styrenic polymers and copolymers, polycarbonates, cellulosic polymers, polyamides, polyimides, polyethers, polyarylene oxides, polyurethanes, polyesters, polyacrylates, polysulfides, polyolefins, polyvinyls and polyvinyl esters. Interpolymers, including block repeating units corresponding to the foregoing polymers, as well as graft polymers and blends of the foregoing, are suitable for use in membranes. The aforementioned polymers can operably bear substituents, such as, fluoro, chloro, bromo, hydroxyl, alkyl, alkoxy, acyl or monocyclic aryl groups, so long as the substituents do not deleteriously affect the membrane properties.

Preferred as membranes are cellulose esters, e.g., cellulose acetate, cellulose diacetate, cellulose triacetate, cellulose propionate, cellulose butyrate, cellulose cyanoethylate, cellulose methacrylate and mixtures thereof. Mixed esters of cellulose, such as cellulose acetate butyrate, mixed cellulose acetates and cellulose acetate methacrylate, are also operable. Commercial cellulose triacetate is the material of choice for the membranes used in the subject method.

Also preferred as membranes are polysulfones or polyethersulfones. Optionally, these membranes may bear a surface coating as in U.S. Pat. No. 4,230,463.

Inasmuch as the flux of materials permeating is generally inversely related to the membrane thickness, it is desirable that the discriminating layer of the membrane be as thin as possible while maintaining adequate membrane strength and good rejection. Homogeneous membranes are operable, but asymmetric membranes are preferred. The preferred asymmetric cellulose ester membrane will typically have a dense discriminating layer less than one micron thick and a much thicker, relatively porous supporting sublayer.

Composite membranes, which have a porous supporting layer of dissimilar composition providing additional strength and integrity to the discriminating layer, are also preferred. For example, microporous polysulfone materials can be used as a supporting layer. Of course, this dissimilar support can include a second discriminating layer, but generally a second discriminating layer is neither necessary nor desirable.

The term "membrane" as used herein is intended to encompass a wide variety of possible configurations known in the prior art. For example, the membrane may be used as a flat film, tubular film or hollow fiber. The membrane can also be a spiral device, provided it is designed to accommodate liquids present in contact with the membrane.

A hollow fiber membrane is generally preferred and can be readily prepared by techniques known in the art. The internal and outside diameter of the fiber can operably be varied to modify membrane characteristics. The inside diameter is preferably about 30 to about 400 microns with a wall thickness of about 5 to about 150 microns. Preferably, the wall thickness is at least about 20 percent of the internal diameter. Especially preferred are fibers having an inside diameter of about 70 to about 130 microns and a wall thickness of about 75 to about 110 microns. Productivity is generally enhanced by using fibers of smaller outside diameter at a given packing factor.

Membranes suitable for use in the subject invention are commercially available. For example, water-wet cellulose ester membranes are available in both hollow fiber and spiral devices. To render these films suitable for the separation of non-aqueous fluids the film must be carefully dried so as to avoid significant disruption of the membrane structure. A preferred method for drying cellulose ester membranes is described in U.S. Pat. No. 4,430,807, which is incorporated herein by reference. One preferred technique for drying the water-wet membrane is to first anneal the fiber in 80° C. water for about 1.5 minutes. The water is then extracted from the fiber with isopropanol and the isopropanol displaced with hexane, heptane or isooctane in the manner taught in U.S. Pat. No. 3,842,515. A particularly preferred technique for drying water-wet hollow fiber membrane bundles is to introduce a 50:50 volume percent mixture of isopropanol and isooctane down the bore of each fiber while an inert gas stream is passed over the hollow fiber's outer surface. When the fiber is essentially free of water, the introduction of the isopropanol/isooctane mixture is terminated and the liquid remaining in the bore pervaporated through the membrane. Generally, such membranes will exhibit an ethylene permeability of at least about $1.2 \times 10^{-10}$ barrer for a membrane discriminating layer of 0.15 microns thickness. The separation factor for ethylene relative to ethane is preferably at least about 2.2.

As some shrinkage occurs in drying the hollow fiber, if the fiber is assembled in a bundle prior to drying, the construction of the bundle should allow tolerance for some shrinkage. For example, if a perforated core is employed, it should be designed so that some reduction in length will take place as the fibers shrink. Also, the epoxy resin tubesheet should be cured with an agent which promotes good adhesion with the hollow fibers, e.g., a commercial aliphatic amine curing agent.

The subject process can be conducted in a single membrane stage, but multiple membrane stages optimized for specific temperatures and feed compositions are generally preferred.

Several of the membrane separation units can be operated in parallel to increase the overall capacity of the separation device. Alternatively, several membranes can be employed in series to improve separation performance. The optimum number of membrane stages depends upon the feed composition, nature of the membrane, the process pressure, the permeate pressure, feed temperature and other factors. Not all the membrane stages need operate with liquids present in the fluid feed. The most advantageous number of stages can be determined empirically.

The membranes of the subject process are more permeable to ethylene than to ethane. Preferably, the permeate from the membranes contains at least about 75 percent, more preferably at least 80 percent of the ethylene present in the feed to the membranes. Preferably, the permeate contains less than about 80 percent of the methane and less than about 60 percent of the ethane present in the feed to the membrane. More preferably, the permeate contains less than about 75 percent of the methane and less than about 55 percent of the ethane present in the feed to the membrane.

A simplified schematic diagram of a system illustrating the subject process is presented as FIG. 1. The ethylene containing feed is introduced through line 2 to a polymerization reactor 4. The polymer product from the reactor 4 is removed through line 5. The vent gases from the reactor 4 are conveyed through line 6 to a compressor 8. The compressed gases from compressor 8 pass through line 10 to a heat exchanger 12 where the gas is cooled to condense diluents and water present. The cooled gas and liquid leaves the heat exchanger 12 through line 14 and is passed to a liquid/gas separator 16. The liquid leaves the separator 16 through line 18 and the gas is passed through line 17 to a dehydrator 19. The dry gas is conveyed by line 20 to a first membrane 22. The permeate exits the membrane 22 through line 24. The non-permeate is conveyed from the membrane 22 through line 26 to a second membrane 28. The permeate passes from the membrane 28 through line 30 and the non-permeate is conveyed through line 32 to a third membrane 34. The permeate from the membrane 34 exits through line 36. The non-permeate from the third membrane 34 is conveyed through line 38 to a furnace 40, where the non-permeate is used as fuel.

The permeate from the three membranes 22, 28 and 34 is conveyed through lines 24, 30 and 36 to a header line 42. The permeate passes through line 42 to be combined in line 2 with feed to to the polymerization reactor 4.

The following example further illustrates the invention, but is not intended to otherwise limit the scope of the invention.

EXAMPLE 1

A hollow fiber of cellulose triacetate was spun and dried as described in Example 1 of U.S. Pat. No. 4,430,807. The fiber had an inside diameter of 77 microns and an outside diameter of 240 microns. The hollow fibers were assembled about a perforated core in parallel orientation to form a 4.5 inch diameter bundle with a tubesheet at each end.

The vent gas from a linear low density polyethylene plant was treated to remove hydrogen chloride, water and diluent present. The treated gas was used as feed to a hollow fiber membrane device. From these separation results, a membrane ethylene recovery system was designed and performance calculated.

The designed system employs hollow fiber membrane devices assembled in parallel to provide the desired capacity. The feed pressure is 4134 kPa (600 psi) and the permeate pressure is 896 kPa (130 psi). The feed flow rate per module is 22.1 standard cubic feet per minute (SCFM). The permeate flow rate per module is 18.2 SCFM and the non-permeate flow rate is 3.9 SCFM per module. The mole fraction of ethylene, methane, ethane and nitrogen in the permeate and non-permeate are tabulated in Table I.

TABLE I

| Compound | Mole Fraction In Feed | Mole Fraction in Permeate | Mole Fraction In Non-Permeate |
| --- | --- | --- | --- |
| $C_2H_4$ | 0.9653 | 0.9786 | 0.8987 |
| $CH_4$ | 0.0070 | 0.0064 | 0.0106 |
| $C_2H_6$ | 0.0274 | 0.0151 | 0.0849 |
| $N_2$ | 0.0002 | Negligible | 0.0058 |

What is claimed is:

1. An improved process for manufacture of ethylene polymers wherein the improvement comprises:
    (a) contacting at least part of the gas mixture remaining after polymerization containing unconverted ethylene monomer with a normally solid, semipermeable, asymmetric, water-dry, cellulose triacetate hollow fiber membrane at conditions which promote selective permeation of ethylene through the membrane; and
    (b) recycling the ethylene-enriched permeate as feed for the ethylene polymerization.

2. The process as described in claim 1 further comprising treating the vent gas mixture from the polymerization process to remove water and hydrogen chloride and bringing the treated gas into direct contact with the semi-permeable membrane.

3. The process as described in claim 2 wherein the ethylene-enriched permeate is at least about 97 mole percent ethylene.

4. The process as described in claim 2 wherein a plurality of hollow fiber membrane devices connected in parallel are employed.

5. The process as described in claim 2 wherein a plurality of hollow-fiber membrane devices connected in series are employed.

6. The process as described in claim 2 wherein the hollow fiber has an inside diameter in the range from about 70 to about 130 microns and a wall thickness in the range from about 75 to about 110 microns.

7. The process as described in claim 6 wherein the membrane has an ethylene permeability of at least about $1.2 \times 10^{-10}$ barrer assuming the discriminating layer of the membrane is 0.15 microns thick.

8. The process as described in claim 7 wherein the separation factor for the membrane for ethylene relative to ethane is at least about 2.2.

9. The process as described in claim 6 wherein the pressure differential across the membrane is in the range from about 100 to about 1,200 psi.

10. The process as described in claim 9 wherein the temperature of the feed gas in contact with the membrane is in the range from about $-10°$ to about $40°$ C.

11. The process as described in claim 6 wherein the permeate from the membrane contains at least 80 percent of the ethylene present in the feed to the membrane.

12. The process as described in claim 11 wherein the permeate from the membrane contains less than about 60 percent of the ethane present in the feed to the membrane.

13. The process as described in claim 2 wherein the permeate from the membrane contains at least 80 percent of the ethylene present in the feed to the membrane.

14. The process as described in claim 13 wherein the permeate from the membrane contains less than about 60 percent of the ethane present in the feed to the membrane.

15. The process as described in claim 2 wherein the ethylene polymer is linear low density polyethylene.

16. The process as described in claim 9 wherein there is no sweep fluid used on the permeate side of the membrane.

* * * * *